Nov. 30, 1965   E. R. ALLER   3,220,778
RAILWAY HOPPER CARS
Filed Oct. 17, 1963   7 Sheets-Sheet 1
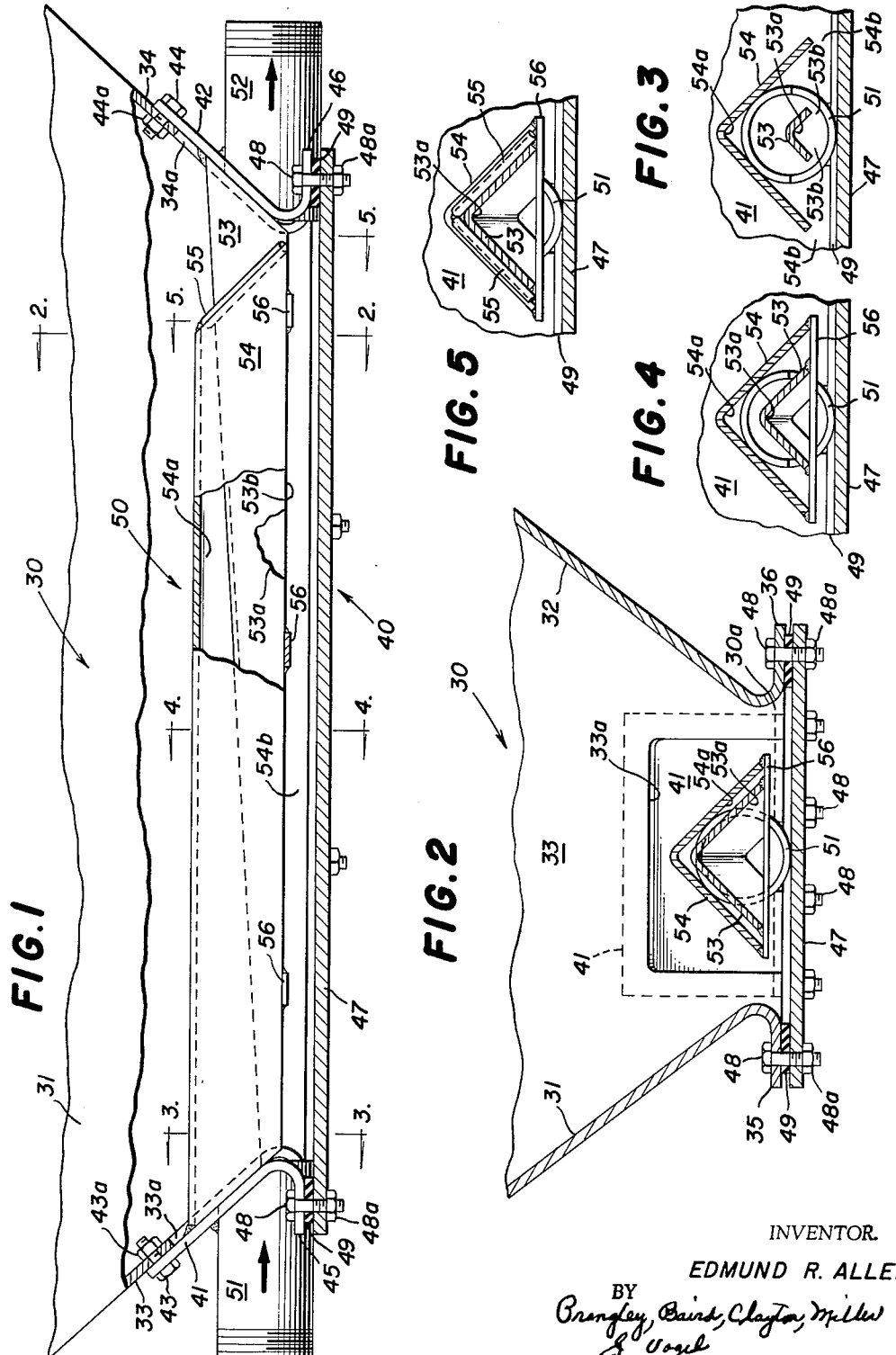
INVENTOR.
EDMUND R. ALLER
BY
Brengley, Baird, Clayton, Miller
& Vogel
ATTYS

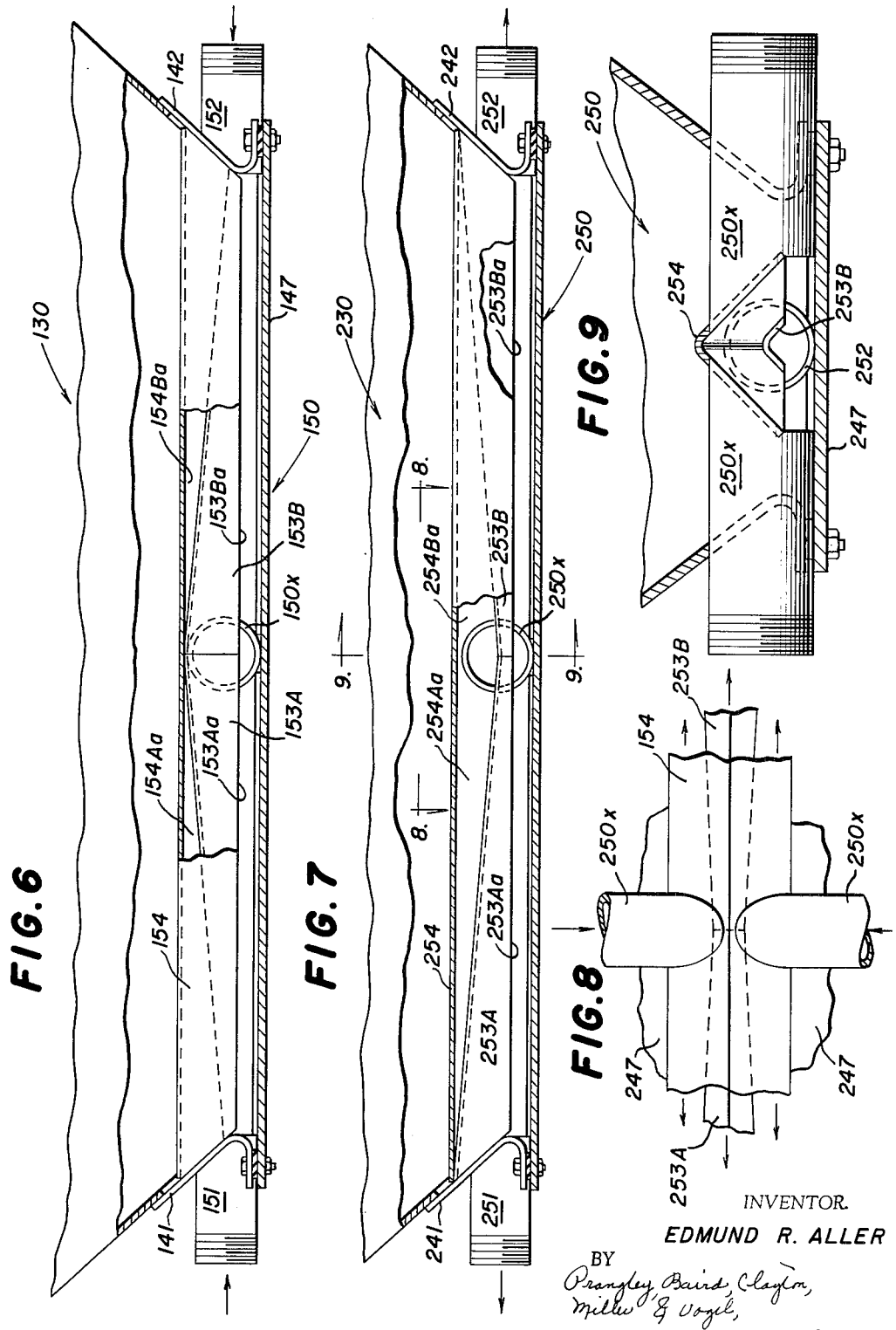

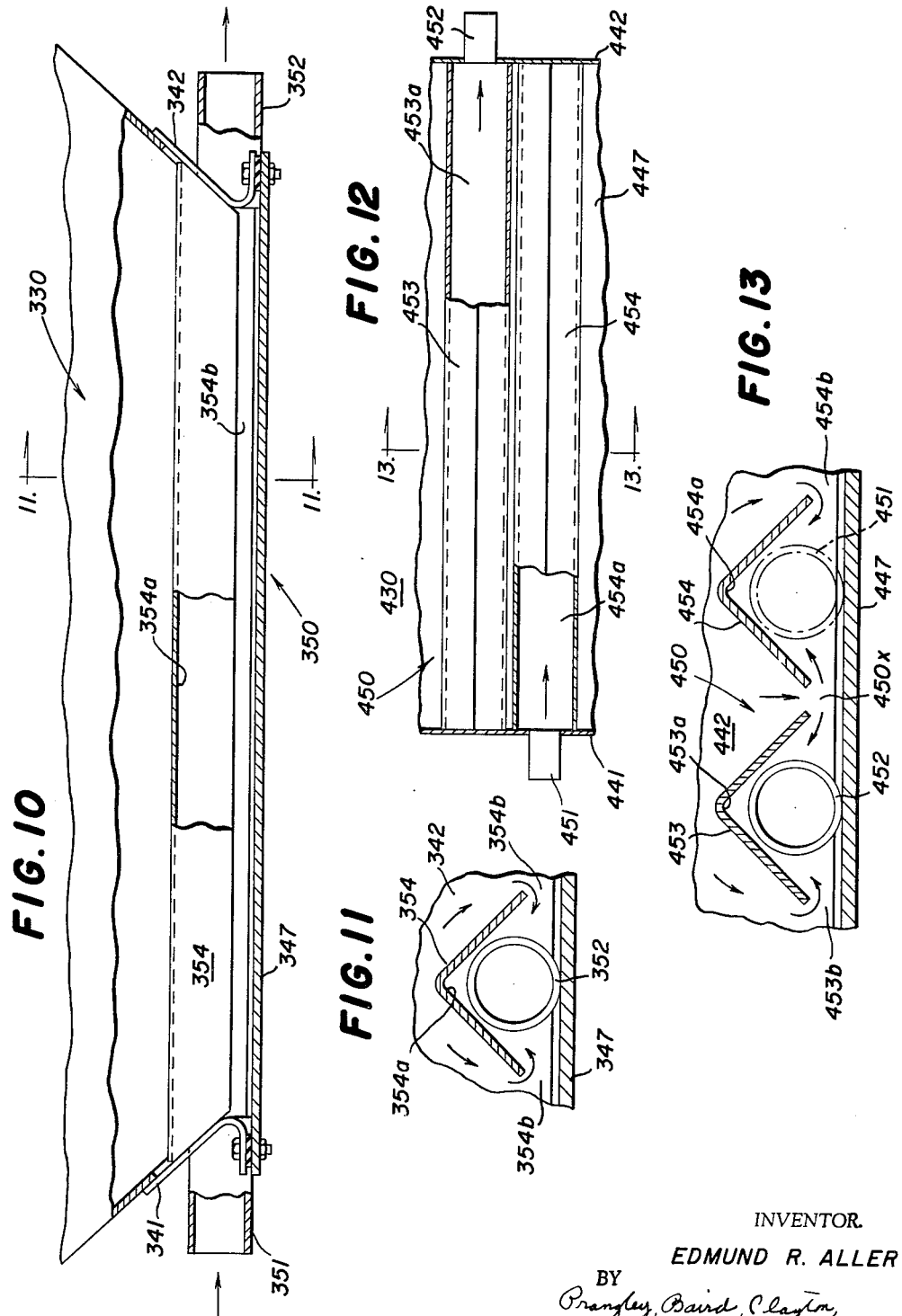

Nov. 30, 1965  E. R. ALLER  3,220,778
RAILWAY HOPPER CARS
Filed Oct. 17, 1963  7 Sheets-Sheet 4
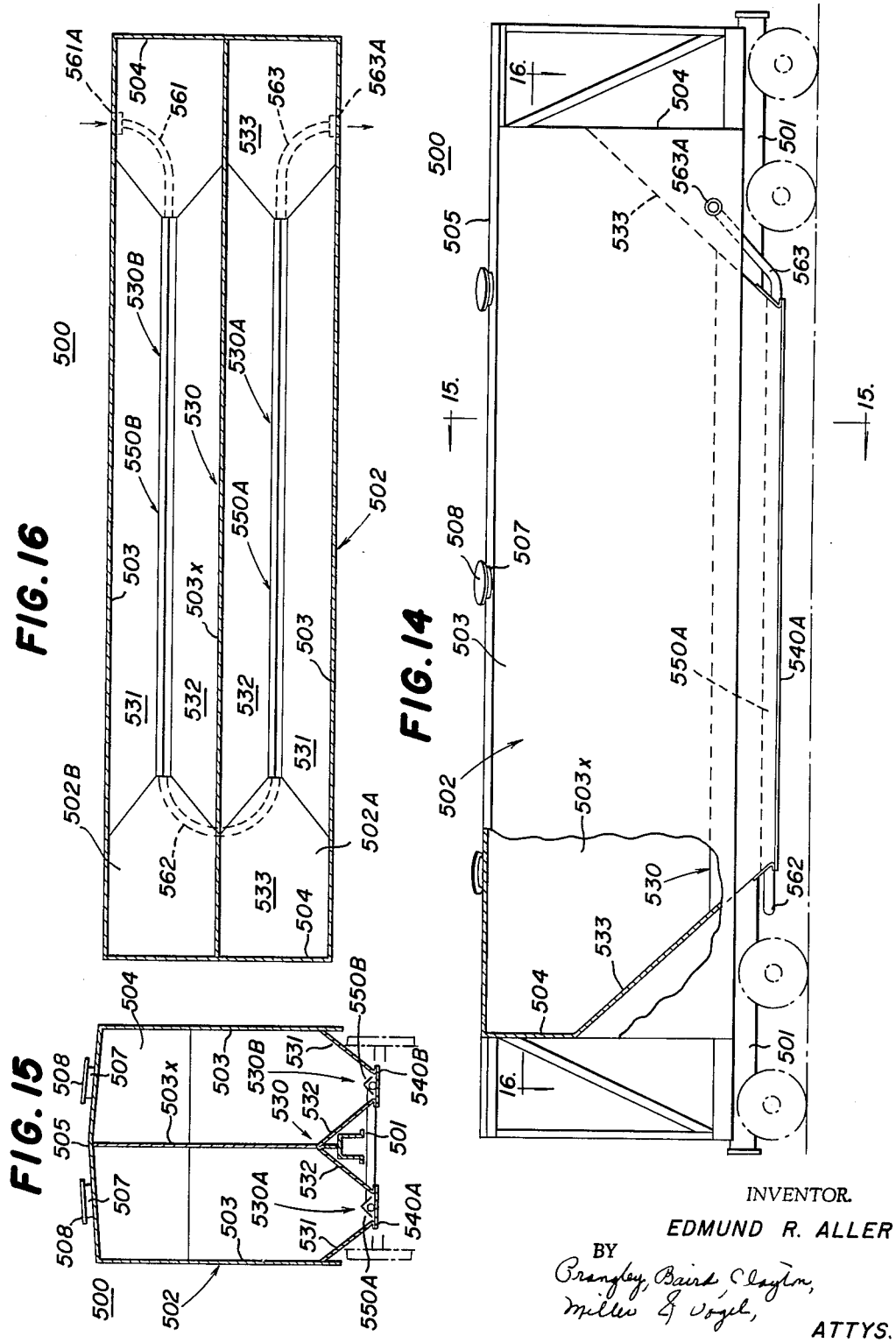
INVENTOR.
EDMUND R. ALLER
BY
ATTYS.

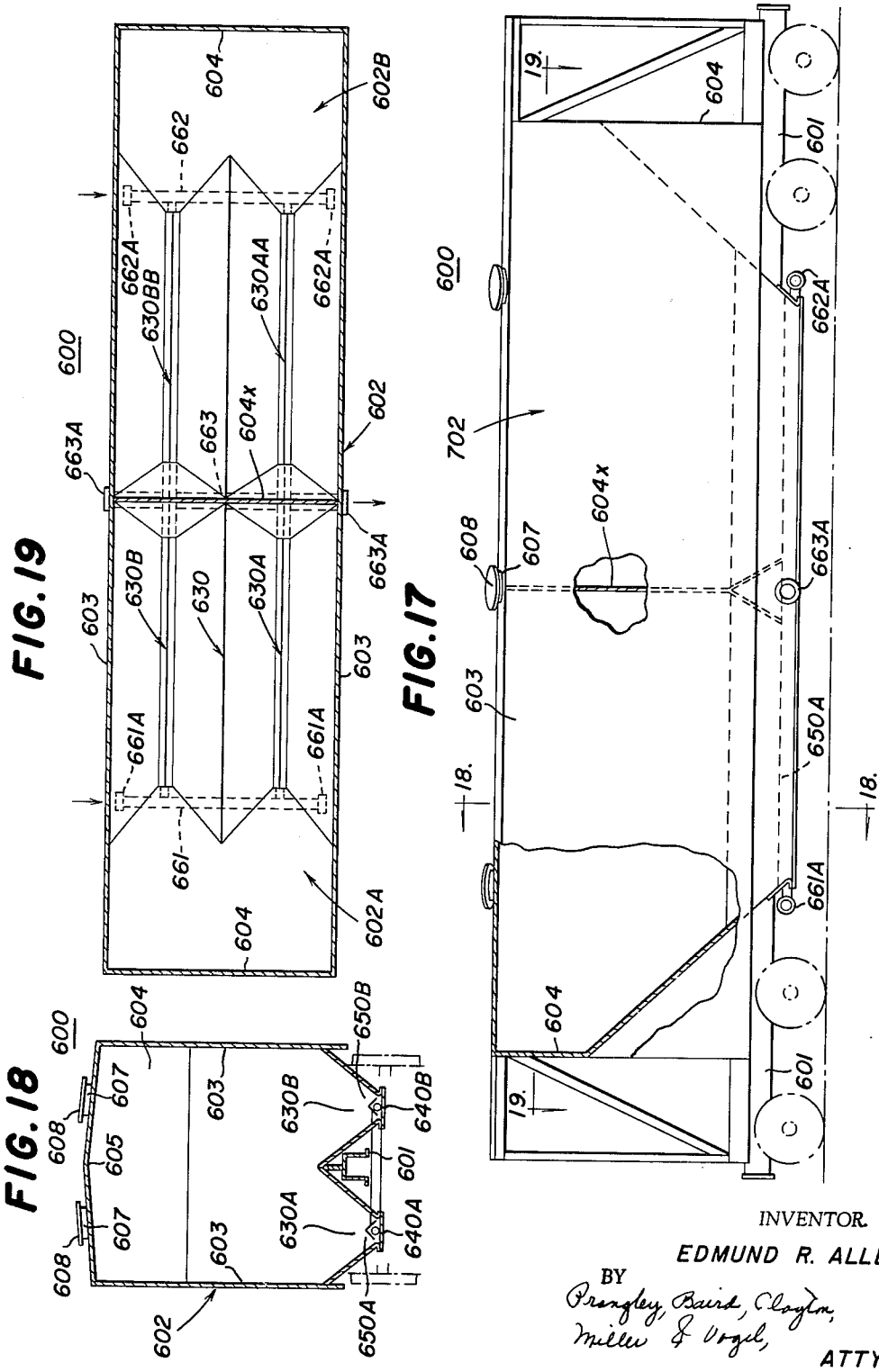

Nov. 30, 1965　　　　　　　E. R. ALLER　　　　　3,220,778
RAILWAY HOPPER CARS
Filed Oct. 17, 1963　　　　　　　　　　　　　7 Sheets-Sheet 6
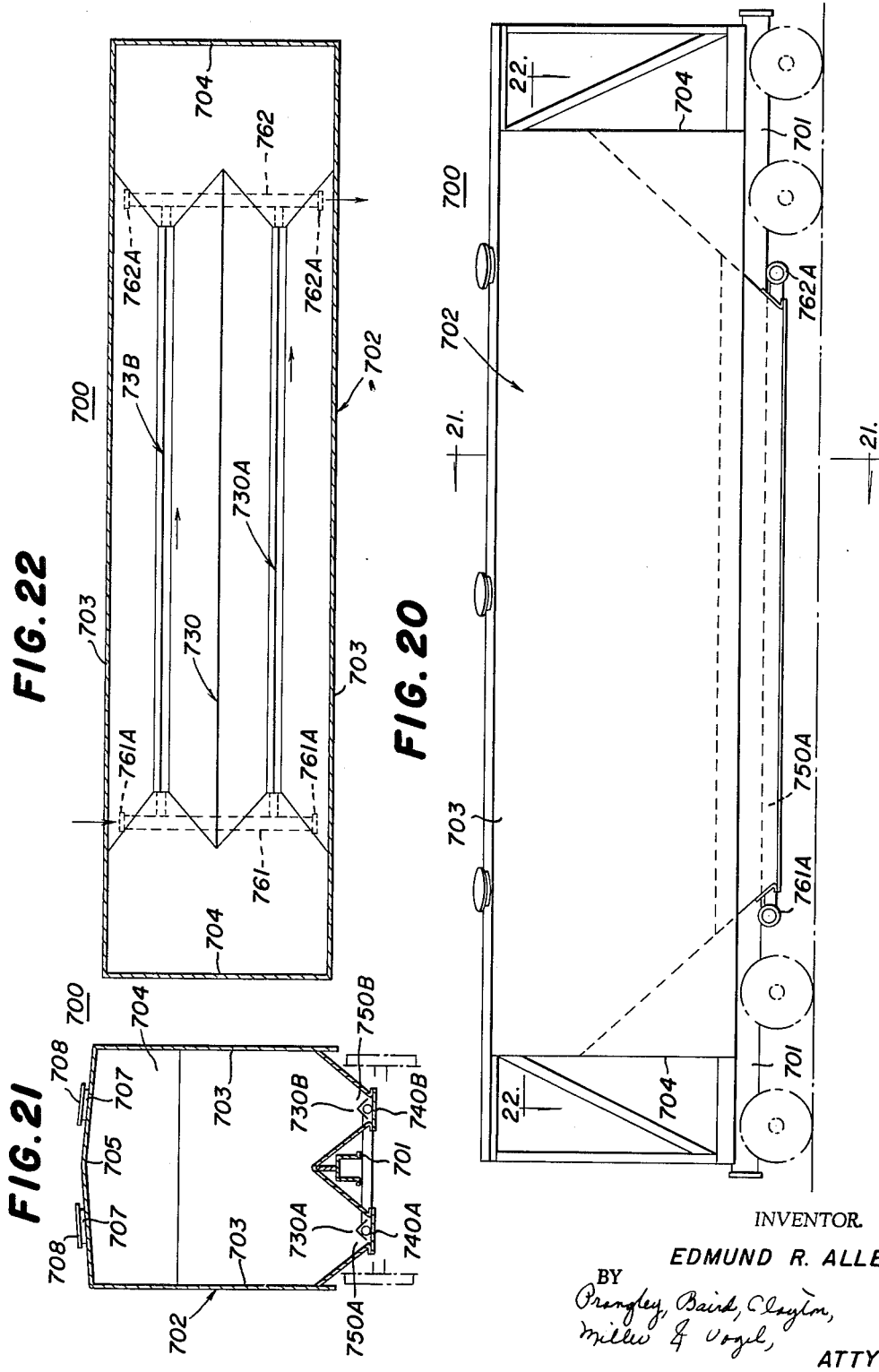
INVENTOR.
EDMUND R. ALLER
BY Prangley, Baird, Clayton,
Miller & Vogel,
ATTYS.

Nov. 30, 1965     E. R. ALLER     3,220,778
RAILWAY HOPPER CARS
Filed Oct. 17, 1963     7 Sheets-Sheet 7
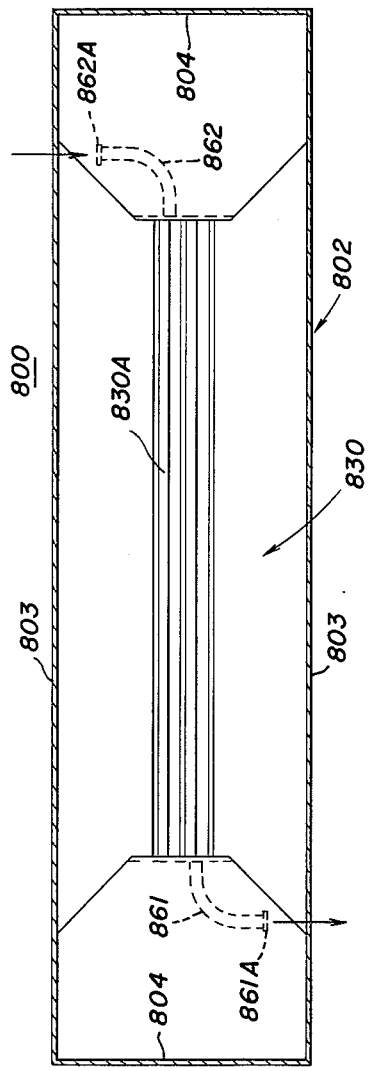
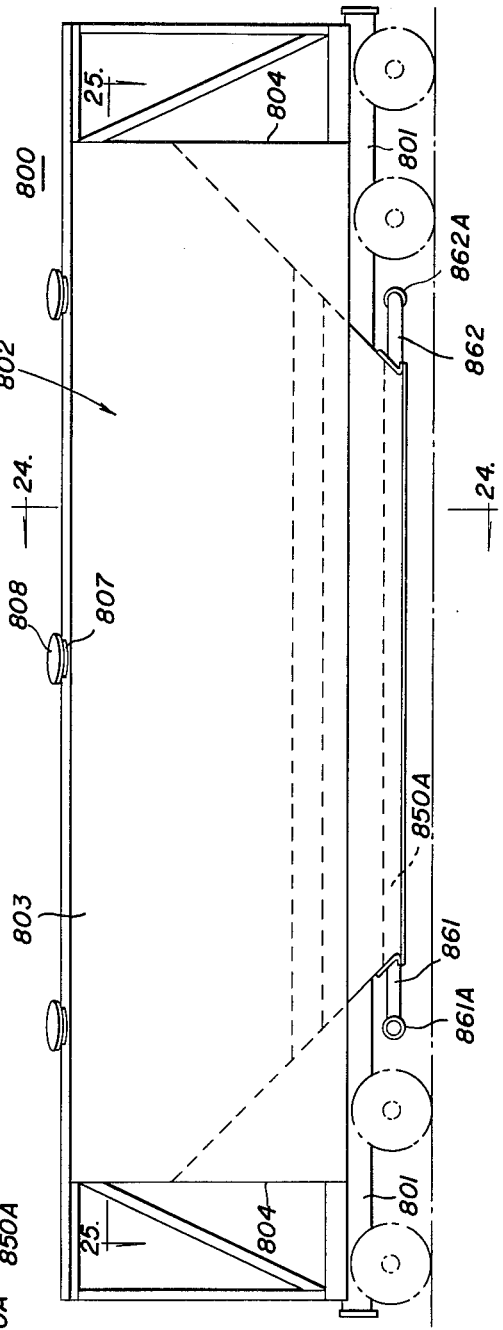
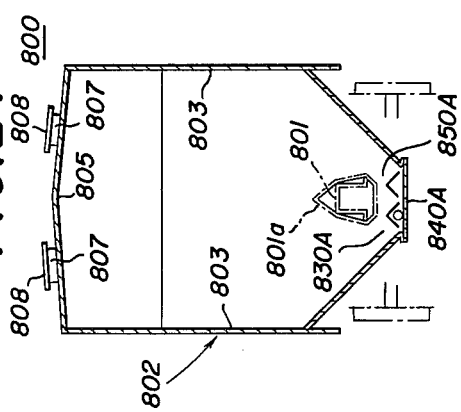
INVENTOR.
EDMUND R. ALLER
BY
ATTYS.

United States Patent Office 3,220,778
Patented Nov. 30, 1965

3,220,778
RAILWAY HOPPER CARS
Edmund R. Aller, Gary, Ind., assignor to General American Transportation Corporation, Chicago, Ill., a corporation of New York
Filed Oct. 17, 1963, Ser. No. 316,876
19 Claims. (Cl. 302—52)

The present invention relates to railway hopper cars for storage and transportation of finely divided or granular material, such, for example, as flour, malt, plastic resin beads, or the like; and it is the general object of the invention to provide in a railway hopper car, improved and simplified pneumatic unloading mechanism for selectively controlling the unloading to the exterior of the granular material from the car body through a bottom opening in the hopper structure incorporated in the car body.

Another object of the invention is to provide in a railway hopper car, pneumatic unloading mechanism of the character mentioned for selectively controlling the unloading to the exterior of the granular material from the bottom opening in the hopper structure, without the necessity of movable valve structure, whereby the overall rate of fall-through of the granular material with respect to the bottom opening is self-regulating to match the overall rate of transporting of the granular material by the pneumatic unloading mechanism.

A further object of the invention is to provide improved pneumatic unloading mechanism of the character described that incorporates a minimum number of stationary elements of simplified construction and arrangement.

A further object of the invention is to provide improved pneumatic unloading mechanism of the character described, wherein the same may be operated to carry out its normal unloading function, when it is connected either to an air suction main or to an air pressure main, and without requiring any adjustments or settings of the mechanism to accommodate normal operation thereof either with subatmospheric pressure or with superatmospheric pressure.

A further object of the invention is to provide improved pneumatic unloading mechanism of the character described that includes an elongated longitudinally extending air passage therethrough for the pneumatic transportation of granular material from an associated hopper, wherein the air passage mentioned has an aspect ratio at least as great as 12.

A further object of the invention is to provide a railway car comprising an elongated longitudinally extending body including bottom structure defining an elongated longitudinally extending communicating hopper and adapted to contain granular material, wherein the hopper has a length commensurate with that of the body between the opposite ends thereof, and elongated longitudinally extending pneumatic unloading mechanism for unloading the granular material from the hopper through an elongated longitudinally extending bottom opening therein, wherein the pneumatic unloading mechanism is of simple and economical construction and arrangement and is operative to unload the granular material from the body substantially uniformly longitudinally therealong and between the opposite ends thereof.

A further object of the invention is to provide a railway car of the character described, wherein the bottom structure of the body defines a pair of elongated longitudinally extending communicating hoppers arranged in side-by-side relation, wherein a pair of the elongated longitudinally extending pneumatic unloading mechanisms are respectively arranged in cooperating relation with the hoppers and wherein a single conduit system is connected to the mechanisms to effect simultaneous operations thereof and the consequent complete unloading of the hoppers and the communicating body.

A still further object of the invention is to provide a railway car comprising an elongated longitudinally extending underframe including a centersill, an elongated longitudinally extending body carried by the underframe and including bottom structure defining an elongated longitudinally extending communicating hopper and adapted to contain granular material, wherein the hopper has a length commensurate with that of the body between the opposite ends thereof, an elongated longitudinally extending tube enclosing the central portion of the centersill and extending longitudinally through the lower portion of the hopper and above the bottom thereof and laterally inwardly from the sides thereof, wherein the opposite ends of the tube are sealed to the respectively adjacent ends of the hopper so as to isolate the granular material contained in the hopper from contact with the centersill, and wherein the hopper has an elongated longitudinally extending bottom opening arranged below the tube, and elongated longitudinally extending pneumatic unloading mechanism arranged in the bottom of the hopper and operative to unload the granular material from the hopper and the body through the bottom opening in the hopper.

Further features of the invention pertain to the particular arrangement of the elements of the railway hopper car and of the pneumatic unloading mechanism therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view, partly broken away, of the lower portion of a hopper incorporating pneumatic unloading mechanism and embodying the present invention;

FIG. 2 is a lateral sectional view of the hopper and the unloading mechanism, this view being taken in the direction of the arrows along the line 2—2 in FIG. 1;

FIGS. 3, 4 and 5 are successive lateral sectional views of the unloading mechanism, these views being taken in the directions of the arrows along the successively longitudinally spaced-apart lines 3—3, 4—4, and 5—5 in FIG. 1;

FIG. 6 is a side elevational view, partly broken away, similar to FIG. 1, of the lower portion of a hopper incorporating a modified form of the pneumatic unloading mechanism;

FIG. 7 is a side elevational view, partly broken away, similar to FIG. 1, of the lower portion of a hopper incorporating another modified form of the pneumatic unloading mechanism;

FIG. 8 is a fragmentary plan view of the hopper and the unloading mechanism, this view being taken in the direction of the arrows along the line 8—8 in FIG. 7;

FIG. 9 is a lateral sectional view of the hopper and the unloading mechanism, this view being taken in the direction of the arrows along the line 9—9 in FIG. 7;

FIG. 10 is a side elevational view, partly broken away, similar to FIG. 1, of the lower portion of a hopper incorporating a further modified form of the pneumatic unloading mechanism;

FIG. 11 is a lateral sectional view of the unloading mechanism, this view being taken in the direction of the arrows along the line 11—11 in FIG. 10;

FIG. 12 is a reduced plan view, partly broken away, of the lower portion of a hopper incorporating yet another modified form of the pneumatic unloading mechanism;

FIG. 13 is an enlarged lateral sectional view of the unloading mechanism, this view being taken in the direction of the arrows along the line 13—13 in FIG. 12;

FIG. 14 is a side elevational view, partly broken away, of a railway hopper car incorporating the form of the unloading mechanism shown in FIGS. 1 to 5, inclusive;

FIG. 15 is a lateral vertical sectional view of the railway car, this view being taken in the direction of the arrows along the line 15—15 in FIG. 14;

FIG. 16 is a horizontal sectional view of the railway car, this view being taken in the direction of the arrows along the line 16—16 in FIG. 14;

FIG. 17 is a side elevational view, partly broken away, similar to FIG. 14, of a railway hopper car incorporating the form of the unloading mechanism shown in FIG. 6;

FIG. 18 is a lateral vertical sectional view of the railway car, this view being taken in the direction of the arrows along the line 18—18 in FIG. 17;

FIG. 19 is a horizontal sectional view of the railway car, this view being taken in the direction of the arrows along the line 19—19 in FIG. 17;

FIG. 20 is a side elevational view, similar to FIG. 14, of a railway hopper car incorporating the form of the unloading mechanism shown in FIGS. 10 and 11;

FIG. 21 is a lateral vertical sectional view of the railway car, this view being taken in the direction of the arrows along the line 21—21 in FIG. 20;

FIG. 22 is a horizontal sectional view of the railway car, this view being taken in the direction of the arrows along the line 22—22 in FIG. 20;

FIG. 23 is a side elevational view, similar to FIG. 14, of a railway hopper car incorporating the form of the unloading mechanism in FIGS. 12 and 13;

FIG. 24 is a lateral vertical sectional view of the railway car, this view being taken in the direction of the arrows along the line 24—24 in FIG. 23; and FIG. 25 is a horizontal sectional view of the railway car, this view being taken in the direction of the arrows along the line 25—25 in FIG. 23.

Referring now to FIGS. 1 to 5, inclusive, of the drawings, there is illustrated the combination of a hopper 30 that is adapted to contain finely divided or granular material and pneumatic unloading mechanism 50 for the hopper 30, and embodying the features of the present invention. Specifically, the hopper 30 is adapted to contain such materials as flour, malt, plastic resin beads, or the like, and essentially comprised a pair of elongated longitudinally extending and laterally spaced-apart side walls 31 and 32 extending downwardly and inwardly toward each and a pair of laterally extending and longitudinally spaced-apart end walls 33 and 34 extending downwardly and inwardly toward each other, whereby the hopper 30 has substantially an inverted frusto-pyramidal configuration. The end walls 33 and 34 have two longitudinal aligned and corresponding openings 33a and 34a respectively formed in the central portions of the bottom edges thereof, and the bottom of the hopper 30 has a substantially rectangular bottom opening 30a therein. The bottom portions of the side walls 31 and 32 project downwardly somewhat below the bottom edges of the end walls 33 and 34 and respectively terminate in two identical outwardly directed flanges 35 and 36 disposed in a substantially horizontal plane.

A bottom cover 40 is arranged below the hopper 30 and detachably secured thereto to close the bottom opening 30a. More particularly, the bottom cover 40 comprises a pair of laterally extending and longitudinally spaced-apart end plates 41 and 42 respectively detachably secured to the end walls 33 and 34 by two series of bolts 43 and 44, the bolts 43 being provided with cooperating nuts 43a and the bolts 44 being provided with cooperating nuts 44a. The end plates 41 and 42 respectively close the openings 33a and 34a respectively formed in the adjacent end walls 33 and 34; and further the bottom portions of the end plates 41 and 42 respectively terminate in two identical outwardly directed flanges 45 and 46 that are also disposed in the horizontal plane of the flanges 35 and 36. Thus, the flanges 35, 36, 45 and 46 respectively cooperate to provide in effect a composite rectangular collar surrounding the bottom opening 30a in the hopper 30. Also, the bottom cover 40 comprises an elongated longitudinally extending substantially rectangular bottom plate 47 that is detachably secured to the flanges 35, 36, 45 and 46 by a series of bolts 48 provided with cooperating nuts 48a. A suitable resilient gasket 49, formed of rubber, or the like, is arranged between the flanges 35, 36, 45 and 46 and the adjacent marginal portion of the bottom plate 47, so as to render water-tight the joint therebetween.

The unloading mechanism 50 is carried by the bottom cover 40, and specifically by the end plates 41 and 42 thereof; and essentially comprises an inlet conduit 51 arranged in an opening provided in the lower portion of the end plate 41 and rigidly secured in place, as by welding, and an outlet conduit 52 arranged in an opening provided in the lower portion of the end plate 42 and rigidly secured in place, as by welding; which conduits 51 and 52 are arranged in longitudinal alignment with each other along the longitudinal center line of the bottom opening 30a. Also, the mechanism 50 comprises elongated longitudinally extending inner and outer inverted trough-like members 53 and 54 arranged in nested relation with each other and extending between the end plates 41 and 42, each of the members 53 and 54 having a lateral cross section that is substantially inverted V-shaped. One end of the outer member 54 is rigidly sealed and secured to the end plate 41, as by welding; and the corresponding one end of the inner member 53 terminates adjacent to the end plate 41. The other end of the inner member 53 is rigidly sealed and secured to the end plate 42, as by welding; and the corresponding other end of the outer member 54 terminates short of the end plate 42. The rest of the outer member 54 is disposed in a substantially horizontal position parallel to the bottom plate 47; while the crest of the inner member 53 is disposed in a sloping position with respect to the bottom plate 47. Specifically, the crest of the inner member 53 slopes downwardly from the end plate 42 toward the end plate 41. In the arrangement an inner tunnel 53a is defined within the inner member 53 and an outer tunnel 54a is defined within the outer member 54 and also between the members 54 and 53. Due to the previously described geometry of the members 53 and 54, it follows that the outer tunnel 54a is of variable cross sectional area, progressively decreasing in the longitudinal direction away from the end wall 41, and that the inner tunnel 53 is of variable cross sectional area, progressively increasing in the longitudinal direction away from the end wall 41. The end of the outer tunnel 54a disposed adjacent to the end wall 41 has a maximum cross sectional area and directly communicates with the adjacent open inner end of the inlet conduit 51; and similarly, the end of the inner tunnel 53a disposed adjacent to the end wall 42 has a maximum cross sectional area and directly communicates with the adjacent open inner end of the outlet conduit 52. Further, the extreme other end of the outer member 54 terminating short of the end plate 42 closely approaches the inner member 53 and is rigidly connected thereto by a suitable plug 55, as by welding, thereby to close the corresponding extreme other end of the outer tunnel 54a. Thus, the members 54 and 53 are respectively rigidly secured to the end plates 41 and 42, and are also rigidly secured to each to provide a rigid bridge-like structure between the end plates 41 and 42 and positioned in the bottom of the hopper 30.

The opposite lower edges of the outer member 54 are arranged in laterally spaced-apart and substantially parallel relation with respect to each other and disposed in a horizontal plane positioned only somewhat above the top of the bottom plate 47, so as to define a corresponding pair of elongated longitudinally extending and laterally spaced-apart narrow slots 54b therebetween and respectively communicating between the opposite sides of the bottom portion of the interior of the hopper 30 and the opposite sides of the bottom of the outer tunnel 54a. Similarly, the opposite lower edges of the inner member 53 are arranged in laterally spaced-apart and converging relation with respect to each other and disposed in the horizontal plane of the lower edges of the outer member 54 and thus somewhat above the top of the bottom plate 47, so as to define a corresponding pair of elongated longitudinally extending and laterally spaced-apart narrow passages 53b therebetween and respectively communicating between the opposite sides of the bottom of the inner tunnel 53a and the adjacent opposite sides of the bottom of the outer tunnel 54a. In order to restrain the lower edges of the members 53 and 54 in the positions described and to prevent the possibility of lateral spreading thereof, a plurality of laterally extending and longitudinally spaced-apart straps 56 are arranged below the edges mentioned and rigidly secured thereto, as by welding.

Considering now the general mode of operation of the unloading mechanism 50, it is noted that when the hopper 30 contains granular material, the granular material is supported upon the bottom plate 47 and embeds the outer and inner members 54 and 53 in an obvious manner. Also, the granular material spills laterally from the opposite sides of the bottom of the hopper 30 through the two narrow slots 54b and into the opposite sides of the bottom of the outer tunnel 54a and accumulates therein in two corresponding elongated longitudinally extending heaps, thereby blocking or plugging-up the two slots 54b. However, these two heaps of granular material do not block or obstruct the top and upper side portions of the outer tunnel 54a, although they do block or obstruct the lower side portions of the outer tunnel 54a. Now, when a stream of air is passed into the inlet conduit 51 the same proceeds into the adjacent one end of the outer tunnel 54a and moves longitudinally therein toward the other end of the outer tunnel 54a at the plug 55. The pressure of the air in the outer tunnel 54a causes the air to sweep in two curtains laterally from the opposite lower portions of the outer tunnel 54a through the two adjacent narrow passages 53b and into the interior of the inner tunnel 53a; whereby a current of air is reformed in the inner tunnel 53a and passes longitudinally therethrough and into the outlet conduit 52 and thence to the exterior of the hopper 30. As the two air curtains mentioned sweep laterally from the outer tunnel 54a into the inner tunnel 53a and across the two heaps of granular material supported upon the adjacent surface of the bottom plate 47 and in the opposite lower sides of the outer tunnel 54a, the granular material in each heap is entrained in the corresponding air curtain and is transported therewith through the adjacent one of the passages 53b and thence into the inner tunnel 53a. The granular material entrained in the current of air passing through the inner tunnel 53a is transported therewith into the outlet conduit 52 and thence to the exterior of the hopper 30. Accordingly, the passing of a current of air from the inlet conduit 51 longitudinally through the outer and inner tunnels 54a and 53a and into the outlet conduit 52 effects the unloading of the granular material from the hopper 30 to the exterior.

In the operation of the unloading mechanism 50, the current of air may be produced either by connecting the inlet conduit 51 to an air pressure main or by connecting the outlet conduit 52 to an air suction main, whereby the mechanism 50 is operative either at superatmospheric pressure or at subatmospheric pressure. Moreover, the two systems may be employed indiscriminately, without adjusting or adapting the mechanism 50 to the particular system that might be employed. However, the mechanism 50 is operative with a low pressure differential between the conduits 51 and 52 of about $3\#/in.^2$ in the constructional example set forth below. Thus, the pressure in the inlet conduit 51 may be $+4\#/in.^2$ and the pressure in the outlet conduit 52 may be $+1\#/in.^2$, or the pressure in the inlet conduit 51 may be $-1\#/in.^2$ and the pressure in the outlet conduit 52 may be $-4\#/in.^2$. In either case, the pressure differential is about $3\#/in.^2$, as noted above. Also, employing either system noted, the unloading of the granular material from the hopper 30 takes place uniformly longitudinally of the bottom thereof and quite completely, without leaving residual deposits of the granular material in the hopper 30. Furthermore, the rate of unloading of the granular material is automatically set by the pressure differential noted and is self-regulating as the unloading proceeds, since the angle of repose of the granular material in each longitudinally extending heap below the members 53 and 54 prevents choking of the inner tunnel 53a, with the result that there is no possibility of obstructing the inner tunnel 53a, regardless of the head of the granular material in the hopper 30.

In the constructional example of the pneumatic unloading mechanism 50 mentioned above; the overall length of the crests of the assembled inner and outer members 53 and 54 was 12′-10⅜″; the sides of the outer member 54 were equal and uniform at 4″; the sides of the inner member 53 were unequal and tapered from ¾″ to 3³²⁄₃₂″; the sides of each of the members 53 and 54 were disposed at an angle of 90° with respect to each other; each of the conduits 51 and 52 had an inside diameter of 2⁷⁄₁₆″; and the plane of the lower edges of the members 53 and 54 above the top surface of the bottom plate 47 was 1″. This particular constructional example of the mechanism was especially designed for use in the hopper 30 that carried polyethylene plastic beads of the character normally employed in injection molding machines of conventional design.

In the construction of the mechanism 50 it is not critical that the inner and outer members 53 and 54 have the same lateral cross sectional configuration, and the inverted V-shape is not critical. Specifically, these members may have a lateral cross section that is arched, semicircular, semi-elliptic, semi-rectangular, etc. The important point is that the sides of these members 53 and 54 leave only a narrow slot between the lower edges thereof and the adjacent top surface of bottom plate 47 through which the granular material may spill from the bottom of the hopper 30, so as to prevent obstructing of the inner tunnel 53a. Further, the forward taper of the cross section of the outer tunnel 54a comprises an important constructional feature, since the corresponding reduction of the cross sectional area of the outer tunnel 54a insures that the two longitudinally extending air curtains projecting laterally inwardly from the outer tunnel 54a into the inner tunnel 53a are substantially uniform longitudinally of the lengths thereof, with the result that the mechanism 50 produces substantially uniform unloading of the granular material longitudinally along the bottom thereof and into the inner tunnel 53a.

Further, in conjunction with the operation of the mechanism 50, it is noted that the conduits 51 and 52 may be employed respectively as the outlet conduit and as the inlet conduit with the consequent reversal of the direction of the current of air through the inner and outer tunnels 53a and 54a and the corresponding reversal of the direction of the two air curtains between the two tunnels 53a and 54a. Also, in this case either subatmospheric or superatmospheric pressure may be employed to produce the current of air, as previously explained. However, the utilization of the conduits 51 and 52 respectively as inlet and outlet conduits constitutes the preferred arrangement, as this direction of sweep of the two air curtains from the outer tunnel 54a into the inner tunnel 53a insures the most complete emptying of residual granular material from the hopper 30 at the conclusion of this operation.

Reverting to the constructional example of the mechanism 50 described above, the composite tunnels 53a and 54a have an average overall length of about 150 inches between the two conduits 51 and 52, and the composite tunnels 53a and 54a have an average lateral cross sectional area of about 12 sq. in. Thus, the average lateral dimension of the composite tunnels 53a and 54a may be taken as the square root of 12 sq. in. or about 3.5 in. The aspect ratio of the composite tunnels 53a and 54a is defined as the ratio of the average length thereof to the average lateral dimensions thereof, or 150/3.5=43. While the aspect ratio of 43 of the composite tunnels 53a and 54a is exceedingly great, it may be generalized that any aspect ratio greater than 12 is considered great in the pneumatic transfer of granular material. Hence, the mechanism 50 comprises the composite tunnels 53a and 54a that have an aspect ratio of about 43, that is substantially greater than 12, which is considered great in the pneumatic transfer of granular material. The utilization of a great aspect ratio in the composite tunnels 53a and 54a insures that the granular material in the two adjacent elongated longitudinally extending heaps is entrained in the composite current of air passing longitudinally through the composite tunnels 53a and 54a by the momentum of the current of air. Accordingly, it is very advantageous that the mechanism 50 incorporates the air passage (the composite tunnels 53a and 54a) for transporting the granular material, wherein the air passage has an aspect ratio at least as great as 12, as explained above.

Referring now to FIG. 6, the hopper 130 there illustrated is provided with the modified form of the pneumatic unloading mechanism 150 that is essentially of the construction of the mechanism 50 previously described, except that in this case the inner member is formed in two complementary end sections 153A and 153B having crests that respectively taper from the adjacent end plates 141 and 142 upwardly toward the outer member 154 at the center of the bottom of the hopper 130; whereby both of the conduits 151 and 152 comprise inlet conduits respectively communicating with the adjacent outer ends of the two outer tunnel sections 154Aa and 154Ba. Also, this construction requires two outlet conduits 150x commonly communicating with the center junction of the two inner tunnel sections 153Aa and 153Ba.

The fundamental operation of the mechanism 150 is the same as that of the mechanism 50, except in this case outside air is supplied into both of the inlet conduits 151 and 152 and removed, together with the unloaded granular material, via the two outlet conduits 150x.

Referring now to FIGS. 7 to 9, inclusive, the hopper 230 there illustrated is provided with the modified form of the pneumatic unloading mechanism 250 that is essentially of the construction of the mechanism 150, except for the reversal of parts, as noted below. In this case, the inner member is formed in two complementary end sections 253A and 253B having crests that respectively taper from the adjacent end plates 241 and 242 downwardly away from the outer member 254 at the center of the bottom of the hopper 230; whereby both of the conduits 251 and 252 comprise outlet conduits respectively communicating with the adjacent outer ends of the two inner tunnel sections 253Aa and 253Ba. Also, this construction requires two inlet conduits 250x commonly communicating with the center junction of the two outer tunnel sections 254Aa and 254Ba.

The fundamental operation of the mechanism 250 is the same as that of the mechanism 150, except in this case outside air is supplied via the two inlet conduits 250x and removed, together with the unloaded granular material, via the two outlet conduits 251 and 252.

Referring now to FIGS. 10 and 11, the hopper 330 there illustrated is provided with a modified form of the pneumatic unloading mechanism 350 that embodies the basic principles of the mechanism 50, previously described, although the mechanism 350 is of greatly simplified construction and arrangement. In this case, only the single member 354 extends between the end plates 341 and 342 and defines the single tunnel 354a, with which the conduits 351 and 352 communicate at the opposite ends thereof. Again, the laterally spaced-apart lower edges of the opposite sides of the member 354 are spaced above the adjacent top surface of the bottom plate 347 to define the pair of longitudinally extending and laterally spaced-apart narrow slots 354b; whereby the granular material in the bottom of the hopper 330 falls through the slots 354b to form the two elongated longitudinally extending heaps of granular material in the opposite sides of the bottom of the tunnel 354a. Thus, the passage of the current of air longitudinally through the tunnel 354a entrains the granular material from the two heaps and transports the same therewith into the outlet conduit 352 and thence to the exterior.

While this form of the mechanism 350 is entirely satisfactory in operation to effect uniform unloading of the granular material from the hopper 330 along the length thereof and ultimate complete unloading of the hopper 330, the unloading rate of this mechanism is not as high as that of the mechanism 50, as previously described, employing comparable currents of air moving therethrough. In other words, the peculiar arrangement of the inner and outer members 53 and 54 that is productive of the pair of air curtains extending longitudinally through the passages 53b and flowing laterally therethrough from the outer tunnel 54a into the inner tunnel 53a greatly facilitates the entrainment of the granular material and the consequent rate of transportation thereof to the exterior of the associated hopper 30.

Thus, while the mechanism 350 is greatly simplified with respect to the mechanism 50, the rate of unloading of the granular material by the mechanism 350 from the associated hopper 330 is essentially lower than the rate of unloading of the granular material by the mechanism 50 from the associated hopper 30.

Referring now to FIGS. 12 and 13, the hopper 430 there illustrated is provided with the modified form of the pneumatic unloading mechanism 450 that embodies the basic principles of the mechanism 50 previously described. In this case, the two members 453 and 454 are arranged in side-by-side relation, instead of in nested relation, with each other, and both extend longitudinally between the end plates 441 and 442. The end plate 441 carries the inlet conduit 451 communicating with the adjacent one end of the tunnel 454a defined within the member 454; and the end plate 442 carries the outlet conduit 452 communicating with the adjacent other end of the tunnel 453a defined within the member 453. In this case the two longitudinally extending slots 453b and 454b are respectively formed at the outer side edges of the members 453 and 454; while the longitudinally extending slot or space 450x is formed mutually between the inner side edges of the members 453 and 454 and between such edges and the adjacent top surface of the bottom plate 447. The other end of the tunnel 454a is closed by the end plate 442; while the one end of the tunnel 453a is closed by the end plate 441.

In this case, the granular material in the bottom of the hopper 430 spills through the three slots 453b, 454b and 450x to form three corresponding elongated longitudinally extending heaps respectively in the tunnels 453 and 454 and mutually in the tunnels 454 and 453. The current of air introduced into the inlet conduit 451 proceeds longitudinally through the tunnel 454a; and from the tunnel 454a a longitudinally extending air curtain sweeps laterally through the slot 450x into the tunnel 453a; and in the tunnel 453a the current of air is reformed and proceeds longitudinally therethrough and thence into the outlet conduit 452 and thus to the exterior.

The granular material in the longitudinally extending heap adjacent to the slot 454b is entrained in the current of air proceeding longitudinally through the tunnel 454a;

the granular material in the longitudinally extending heap adjacent to the slot 450x is entrained in the air current sweeping laterally between the tunnels 454a and 453a; and the granular material in the longitudinally extending heap adjacent to the slot 453b is entrained in the current of air proceeding longitudinally through the tunnel 453a. Hence, the granular material is rapidly unloaded from the bottom of the hopper 430 by operation of the mechanism 450.

The pneumatic unloading mechanism of the present invention is especially adapted for unloading granular material from a hopper defined in the bottom of the body of a railway hopper car; and in FIGS. 14 to 16, inclusive, there is illustrated a railway hopper car 500 comprising an elongated longitudinally extending underframe, including a center sill 501, and carrying an elongated longitudinally extending box-like body 502. The body 502 includes a pair of longitudinally extending and laterally spaced-apart side walls 503, a pair of laterally extending and longitudinally spaced-apart end walls 504, a substantially horizontally disposed roof 505, and bottom structure 536. The roof 505 comprises a plurality of hatches 507, provided with removable hatch covers 508, and through which the granular material is loaded into the body 502 for transportation and storage. The bottom structure 530 comprises a pair of longitudinally extending and laterally spaced-apart outer slope sheets 531 respectively joining the adjacent side walls 503, a pair of longitudinally extending and laterally spaced-apart inner slope sheets 532 disposed above and on opposite sides of the center sill 501 and joining each other, and a pair of laterally extending and longitudinally spaced-apart end slope sheets 533 respectively joining the adjacent end walls 504; whereby the bottom structure 530 defines two elongated longitudinally extending and laterally spaced-apart hoppers 530A and 530B communicating with the body 502 and respectively disposed on opposite sides of the center sill 501; which hoppers 530A and 530B are respectively provided with elongated longitudinally extending and laterally spaced-apart bottom openings and respectively carry two elongated longitudinally extending bottom covers 540A and 540B detachably secured thereto. In the arrangement, the lengths of the hoppers 530A and 530B are commensurate with the length of the body 502 between the opposite end walls 504 thereof, due to the provision of the end slope sheets 533; and likewise, the bottom openings in the hoppers 530A and 530B are commensurate with the lengths thereof.

In turn, the two bottom covers 540A and 540B respectively carry two pneumatic unloading mechanisms 550A and 550B that, in the present example, are each identical to the mechanism 50 illustrated in FIGS. 1 to 5, inclusive. In the arrangement; one side wall 503 of the body 502 carries an inlet pipe 561 that is connected to the inlet conduit of the mechanism 550B; the outlet conduit of the mechanism 550B is connected via a pipe 562 to the inlet conduit of the mechanism 550A; the outlet conduit of the mechanism 550A is connected to an outlet pipe 563 carried by the other side wall 503 of the body 502; and the pipes 561 and 563 respectively terminate in two fixtures 561A and 563A that are respectively carried by the side walls 503 and accessible to the exterior of the body 502.

In unloading the granular material from the body 502 of the car 500, the hatch covers 508 are left in therein cooperating positions closing and sealing the respective hatches 507. The covers, not shown, respectively carried by the fixtures 561A and 563A are removed, and the current of air is passed in series through the elements 561A, 561, 550B, 562, 550A, 563 and 563A, thereby to effect unloading of the granular material from the body 502 via the hoppers 530B and 530A by virtue of the operation of the mechanisms 550B and 550A in the manner previously described. In the unloading operation, the air current may be produced either from an air pressure main connected to the fixture 561A or by an air suction main connected to the fixture 563A, as previously explained. In conjunction with the unloading of the body 502 of the car 500, it is noted that the unloading operation may proceed from either side thereof, since the granular material may be delivered into either of the fixtures 563A or 561A for further conveying into the receiving bins into which the granular material is being loaded.

Reconsidering the construction of the body 502 of the railway hopper car 500, it will be observed that the interior thereof is divided into two separated side sections 502A and 502B by an upstanding longitudinally extending bulkhead 503x arranged laterally intermediate the side walls 503; which bulkhead 503x is provided since the two mechanisms 550A and 550B are connected in series relation between the pipes 561 and 562, and since there is a tendency for the air current to cross-feed therebetween, in the absence of the bulkhead 503x, by virtue of the circumstance that the series connection causes the two pipes 561 and 562 to be located at the same end of the body 502.

At this point, it is mentioned that the conduit system incorporated in the railway hopper car 500 may connect the two mechanisms 550A and 550B in parallel relation with each other, as explained more particularly hereinafter in conjunction with the railway hopper car 700 of FIGS. 20 to 22, inclusive; and in this case, the bulkhead 503x may be omitted.

Referring to FIGS. 17 to 19, inclusive, there is illustrated a railway hopper car 600 that is fundamentally of the construction of the car 500 previously described, except in this case the interior of the body 602 is divided into two separated end sections 602A and 602B by an upstanding laterally extending bulkhead 604x arranged longitudinally intermediate the end walls 604. In this case, the bottom structure 630 defines two elongated longitudinally extending and laterally spaced-apart hoppers 630A and 630B in the bottom body section 602A and two elongated longitudinally extending and laterally spaced-apart hoppers 630AA and 630BB in the bottom of the body section 602B. The hoppers 630A and 630AA are provided with respective bottom openings that are closed by a common bottom cover 640A; and the hoppers 630B and 630BB are provided with respective bottom openings that are closed by a common bottom cover 640B. The bottom covers 640A and 640B respectively carry pneumatic unloading mechanisms 650A and 650B that, in the present example, are each of the construction of the mechanism 150 illustrated in FIG. 6.

Further, the body 602 of the car 600 carries a pair of laterally extending air inlet pipes 661 and 662 respectively disposed adjacent to the opposite ends thereof and a laterally extending air outlet pipe 663 disposed adjacent to the center thereof. The air inlet pipe 661 is commonly connected to the two air inlet conduits of the mechanisms 650A and 650B disposed at corresponding one ends thereof; the air inlet pipe 662 is commonly connected to the air inlet conduits of the mechanisms 650A and 650B disposed at corresponding other ends thereof; and the air outlet pipe 663 is commonly connected to the air outlet conduits of the mechanisms 650A and 650B disposed at the centers thereof; the air from the pipe 661 is fed into the air inlet conduits at corresponding one ends of the mechanisms 650A and 650B; the air from the pipe 662 is fed into the air inlet conduits at the corresponding other ends of the mechanisms 650A and 650B; and the air from the mechanisms 650A and 650B is fed via the air outlet conduits thereof into the pipe 663. Thus, the mechanism 650A is operated to unload the two hoppers 630A and 630AA and the mechanism 650B is operated to unload the two hoppers 640B and 640BB; whereby the body sections 602A and 602B are simultaneously unloaded, by virtue of the operations of the mechanisms 650A and 650B in the manner previously described.

Referring to FIGS. 20 to 22, inclusive, there is illustrated a railway hopper car 700 that is of a construction substantially identical to that of the car 500; whereby the two bottom covers 740A and 740B are respectively carried by the hoppers 730A and 730B defined by the bottom structure 730 and respectively close the bottom openings in the hoppers 730A and 730B. In this case, the bottom covers 740A and 740B respectively carry pneumatic unloading mechanisms 750A and 750B that, in the present example, are each of the construction of the mechanism 350 of FIGS. 10 and 11. Further, the body 702 of the car 700 carries a pair of laterally extending air pipes 761 and 762 respectively disposed adjacent to the opposite ends thereof. The air pipe 761 is commonly connected to the air conduits of the mechanisms 750A and 750B at the corresponding one ends thereof; and the air pipe 762 is commonly connected to the air conduits of the mechanisms 750A and 750B at the corresponding other ends thereof. The air pipes 761 and 762 respectively terminate in the pairs of fixtures 761A and 762A; and the fixtures of each pair are respectively arranged at the opposite sides of the body 702.

The granular material contained in the body 702 may be unloaded from either side thereof at either end thereof. For example, the cover carried by one of the fixtures 761A adjacent to the one end and at one side of the body 702 is removed; and, likewise, the cover carried by one of the fixtures 762A adjacent to the other end and at the other side of the body 702 is removed. The current of air is fed from the air pipe 761 through the mechanisms 750A and 750B in parallel relation into the air pipe 762 and thence via the open fixture 762A to the exterior; whereby the granular material is unloaded from the body 702 by virtue of the operations of the mechanisms 750A and 750B in the manner previously described.

At this point, it is mentioned that the conduit system incorporated in the railway hopper car 700 may connect the two mechanisms 750A and 750B in series relation with each other, as disclosed in the railway hopper car 500 of FIGS. 14 to 16, inclusive; and in this case, it is advisable to incorporate a longitudinally extending bulkhead into the body 702, in a manner similar to the arrangement of the longitudinally extending bulkhead 503x in the body 502, so as positively to prevent crossfeed of the air current between the mechanisms 750A and 750B.

Referring to FIGS. 23 to 25, inclusive, there is illustrated a railway hopper car 800 that is of a construction somewhat different from the car 500 in that the center sill 701 thereof is enclosed in a surrounding tubular housing, indicated at 801a in FIG. 24; and the bottom structure 830 is modified to provide a single communicating hopper 830A in bottom of the body 802; which hopper 830A carries a bottom cover 840A closing the bottom opening therein. In turn, the bottom cover 840A carries a pneumatic unloading mechanism 850A that, in the present example, is of the construction of the mechanism 450 of FIGS. 12 and 13. Further, the body 802 carries two air pipes 861 and 862 adjacent to the opposite ends thereof; the air pipe 861 is connected to the air conduit of the mechanism 750A adjacent to the one end thereof; the air pipe 862 is connected to the air conduit of the mechanism 750A adjacent to the other end thereof; and the air pipes 861 and 862 respectively terminate in fixtures 861A and 862A respectively disposed adjacent to the opposite sides of the body 802.

The granular material contained in the body 802 may be unloaded from either side thereof at the appropriate end thereof. For example, the covers carried by the two fixtures 861A and 862A are removed; and the current of air may be passed in either direction through the mechanism 850A. For example, the air current may be passed into the fixture 862A and out of the fixture 861A; whereby the granular material is unloaded from the body 802 by virtue of the operation of the mechanism 850A in the manner previously described.

While the railway hopper cars 500, 600, 700 and 800 have been illustrated as incorporating corresponding forms of the pneumatic unloading mechanisms 50, 150, 350 and 450, for the purpose of the present explanation, it will be understood that, in fact, any one of the forms of the railway hopper cars 500, 700 or 800 may incorporate any one of the forms of the pneumatic mechanisms 50, 150, 350 or 450, as will be obvious from the foregoing descriptions.

In view of the foregoing, it is apparent that there has been provided a pneumatic unloading mechanism for granular material from a hopper, or the like, wherein the mechanism is of improved construction and arrangement, requiring no valve elements or other moving parts, in its operation, and wherein the mechanism is characterized by indiscriminate operation in a highly satisfactory manner, without requiring adjustment or setting thereof, when it is connected to a subatmospheric or suction system, or when it is connected to a superatmospheric or positive pressure system. Also, an improved railway hopper car has been provided that includes an elongated longitudinally extending hopper that is of a length comparable to that of the lading chamber defined in the body of the car between the opposite ends thereof, and incorporating an elongated longitudinally extending pneumatic unloading mechanism of the character noted, whereby operation of the mechanism effects unloading of granular material from the lading chamber and substantially uniformly throughout the length thereof. It is an important feature of the hopper car that the entire lading chamber in the body thereof may be unloaded by a single such pneumatic unloading mechanism. Another important feature of the hopper car is that the entire lading chamber in the body thereof may be unloaded by a pair of such pneumatic unloading mechanisms arranged in lateral side-by-side relation. A further important feature of the hopper car is that the entire lading chamber in the body thereof may be unloaded by a pair of such pneumatic unloading mechanisms via a group of four such hoppers communicating with the bottom of the body. A still further important feature of the hopper car is that any one of the arrangements described may be readily selected for incorporation in the hopper car incident to the manufacture thereof by the corresponding selection of one of a number of simple and standard bottom constructions for the otherwise standard body thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a hopper adapted to contain granular material and including a pair of elongated longitudinally extending and laterally spaced-apart and downwardly and inwardly sloping side walls and a pair of laterally extending and longitudinally spaced-apart and downwardly and inwardly sloping end walls and having a corresponding elongated longitudinally extending bottom opening therein, said end walls having a pair of longitudinally aligned end openings therein, a pair of laterally extending and longitudinally spaced-apart end plates respectively detachably secured to said end walls and respectively closing said end openings, an elongated longitudinally extending bottom plate detachably secured to said side walls and to said end plates and closing said bottom openings, an elongated longitudinally extending inverted trough-like member fixedly secured to said end plates and disposed in the bottom of said hopper when said bottom plate is secured to said side walls and to said end plates, said member defining an elongated longitudinally extending tunnel therethrough, the opposite lower side edges of said member being spaced somewhat above the adjacent surface of said bottom plate to define two elongated longitudinally extending and laterally spaced-apart narrow slots respectively communicating between the opposite sides of the bottom of said hopper and the opposite sides of the bottom of said tunnel when said bottom plate is secured to said side walls and to said end plates, whereby the granular material contained in said hopper spills laterally through said narrow slots and accumulates in two elongated longitudinally extending heaps respectively disposed in the opposite sides of the bottom of said tunnel and without obstructing the top thereof, and two longitudinally spaced-apart conduits respectively fixedly secured to said end plates, the inner ends of said conduits being in direct open communication through the respectively adjacent end openings in said end walls with the respectively adjacent outer ends of said tunnel, whereby a current of air may be passed from one of said conduits longitudinally through said tunnel and into the other of said conduits, with the result that the granular material accumulated in each heap is entrained into the current of air passing longitudinally through said tunnel and is transported therewith into said other conduit, thereby to effect pneumatic unloading of the granular material from said hopper via said other conduit.

2. The combination set forth in claim 1, and further comprising a fixture carried by said one conduit, said fixture being selectively connectible to an air pressure main, whereby air may be blown in a current from said one conduit longitudinally through said tunnel and into said other conduit to effect the pneumatic unloading of the granular material from said hopper.

3. The combination set forth in claim 1, and further comprising a fixture carried by said other conduit, said fixture being selectively connectible to an air section main, whereby air may be drawn in a current from said one conduit longitudinally through said tunnel and into said other conduit to effect the pneumatic unloading of the granular material from said hopper.

4. The combination set forth in claim 1, wherein said tunnel has an aspect ratio at least as great as 12.

5. In combination, an elongated longitudinally extending hopper adapted to contain granular material and having a corresponding elongated longitudinally extending bottom opening therein, an elongated longitudinally extending bottom cover detachably secured to said hopper and closing said bottom opening, an elongated longitudinally extending inverted trough-like member fixedly secured to said bottom cover and disposed in the bottom of said hopper when said bottom cover is secured to said hopper, said member defining an elongated longitudinally extending tunnel therethrough, the opposite lower side edges of said member being spaced somewhat above the adjacent surface of said bottom cover to define two elongated longitudinally extending and laterally spaced-apart narrow slots respectively communicating between the opposite side of the bottom of said hopper and the opposite sides of the bottom of said tunnel when said bottom cover is secured to said hopper, whereby the granular material contained in said hopper spills laterally through said narrow slots and accumulates in two elongated longitudinally extending heaps respectively disposed in the opposite sides of the bottom of said tunnel and without obstructing the top thereof, two inlet conduits fixedly secured to said bottom cover and respectively communicating with the opposite ends of said tunnel, and an outlet conduit fixedly secured to said bottom cover and communicating with the intermediate portion of said tunnel, whereby two currents of air may be respectively passed from said inlet conduits longitudinally through the two corresponding end sections of said tunnel and toward the intermediate portion thereof and thence into said outlet conduit, with the result that the granular material accumulated in each heap is entrained into the current of air passing longitudinally through the corresponding end section of said tunnel and is transported therewith into said outlet conduit, thereby to effect pneumatic unloading of the granular material from said hopper via said outlet conduit.

6. In combination, an elongated longitudinally extending hopper adapted to contain granular material and having a corresponding elongated longitudinally extending bottom opening therein, an elongated longitudinally extending bottom cover detachably secured to said hopper and closing said bottom opening, an elongated longitudinally extending inverted trough-like member fixedly secured to said bottom cover and disposed in the bottom of said hopper when said bottom cover is secured to said hopper, said member defining an elongated longitudinally extending tunnel therethrough, the opposite lower side edges of said member being spaced somewhat above the adjacent surface of said bottom cover to define two elongated longitudinally extending and laterally spaced-apart narrow slots respectively communicating between the opposite sides of the bottom of said hopper and the opposite sides of the bottom of said tunnel when said bottom cover is secured to said hopper, whereby the granular material contained in said hopper spills laterally through said narrow slots and accumulates in two elongated longitudinally extending heaps respectively disposed in the opposite sides of the bottom of said tunnel and without obstructing the top thereof, two outlet conduits fixedly secured to said bottom cover and respectively communicating with the opposite ends of said tunnel, and an inlet conduit fixedly secured to said bottom cover and communicating with the intermediate portion of said tunnel, whereby a main current of air may be passed from said inlet conduit into the intermediate portion of said tunnel and divided therein to form two auxiliary air currents respectively passing longitudinally through the two corresponding end sections of said tunnel and into the respective ones of said two outlet conduits, with the result that the granular material accumulated in each heap is entrained into the auxiliary current of air passing longitudinally through the corresponding end section of said tunnel and is transported therewith into the corresponding one of said outlet conduits, thereby to effect pneumatic unloading of the granular material from said hopper via said two outlet conduits.

7. In combination, an elongated longitudinally extending hopper adapted to contain granular material and having a corresponding elongated longitudinally extending bottom opening therein, an elongated longitudinally extending bottom cover detachably secured to said hopper and closing said bottom opening, first and second elongated longitudinally extending and closely laterally spaced-apart inverted trough-like members carried by said bottom cover and disposed in the bottom of said hopper and respectively defining first and second elongated longitudinally extending tunnels therethrough, the opposite lower side edges of said first member being spaced somewhat above the adjacent surface of said bottom cover to define a pair of first elongated longitudinally extending and laterally spaced-apart narrow slots respectively communicating between one side and the central portion of the bottom of said hopper and the opposite sides of the bottom of said first tunnel, the opposite lower side edges of said second member being spaced somewhat above the adjacent surface of said bottom cover to define a pair of second elongated longitudinally extending and laterally spaced-apart narrow slots respectively communicating between the central portion and the other side of the bottom of said hopper and the opposite sides of the bottom of said second tunnel, whereby the granular material contained in said hopper spills laterally through the outside one of said first slots and accumulates in a first elongated longitudinally extending heap in the bottom of said first tunnel without obstructing the top thereof and spills laterally through the outside one of said second slots and accumulates in a second elongated longitudinally extending heap in the bottom of said second tunnel and spills downwardly in the space between the inside ones of said first and second slots, an inlet conduit communicating with one end of said first tunnel, and an outlet conduit communicating with the other end of said second tunnel, whereby a current of air may be passed from said inlet conduit into said one end of said first tunnel and longitudinally therethrough toward the other end thereof so as to form therefrom an air curtain sweeping from said first tunnel laterally through the inside ones of said narrow slots into said second tunnel and so as to reform a current of air passing longitudinally through said second tunnel toward said other end thereof and into said second conduit, with the result that the granular material accumulated in the first heap is entrained in the air current passing through said first tunnel and is transported therewith into the air curtain, with the result that the granular material that spills downwardly into the space between the inside ones of said first and second slots is entrained into the air curtain and is transported into said second tunnel, and with the result that the granular material accumulated in the second heap is entrained into the air current passing through said second tunnel and is transported therewith into said outlet conduit, thereby to effect pneumatic unloading of the granular material from said hopper via said outlet conduit.

8. In combination, an elongated longitudinally extending hopper adapted to contain granular material and having a corresponding elongated longitudinally extending bottom opening therein, an elongated longitudinally extending bottom cover detachably secured to said hopper and closing said bottom opening, two elongated longitudinally extending inverted trough-like members carried by said bottom cover and disposed in the bottom of said hopper and defining two elongated longitudinally extending tunnels therethrough, said members being arranged in nested relation with each other so that an inner of said tunnels is defined within the inner of said members and so that an outer of said tunnels is defined between said members, the opposite lower side edges of both of said members being spaced somewhat above the adjacent surface of said bottom cover to define two elongated longitudinally extending and laterally spaced-apart narrow slots respectively communicating between the opposite sides of the bottom of said hopper and the opposite sides of the bottom of said outer tunnel and also to define two elongated longitudinally extending and laterally spaced-apart narrow passages respectively communicating between the opposite sides of the bottom of said outer tunnel and the opposite sides of the bottom of said inner tunnel, whereby the granular material contained in said hopper spills laterally through said narrow slots and accumulates in two elongated longitudinally extending heaps respectively disposed in the opposite sides of the bottom of said outer tunnel and without obstructing the top thereof, and two conduits respectively communicating with the outer ends of said tunnels, whereby a current of air may be passed from one of said conduits into the adjacent outer end of the corresponding one of said tunnels and longitudinally therethrough toward the inner end thereof so as to form therefrom two air curtains respectively sweeping from said one tunnel laterally through said narrow passages into the other of said tunnels and so as to reform therefrom a current of air passing longitudinally through said other tunnel and from the inner end thereof toward the outer end thereof and into the other of said conduits, with the result that the granular material accumulated in each heap is entrained into the corresponding air curtain and is transported therewith and is then entrained into the reformed current of air and is transported therewith into said other conduit, thereby to effect pneumatic unloading of the granular material from said other conduit.

9. The combination set forth in claim 8, wherein said one tunnel is said outer tunnel and said other tunnel is said inner tunnel, with the result that the two air curtains sweep laterally inwardly toward each other from said outer tunnel into said inner tunnel.

10. The combination set forth in claim 8, wherein said one tunnel is said inner tunnel and said other tunnel is said outer tunnel, with the result that the two air curtains sweep laterally outwardly away from each other from said inner tunnel into said outer tunnel.

11. The combination set forth in claim 8, wherein the cross sectional area of said outer tunnel progressively decreases from the outer end thereof toward the inner end thereof, and the cross sectional area of said inner tunnel progressively increases from the inner end thereof toward the outer end thereof.

12. The combination set forth in claim 8, and further comprising means extending between said members for blocking the inner end of said outer tunnel.

13. The combination set forth in claim 8, wherein each of said members has a substantially inverted V-shaped in lateral cross section.

14. In combination, an elongated longitudinally extending hopper adapted to contain granular material and having a corresponding elongated longitudinally extending bottom opening therein, an elongated longitudinally extending bottom cover detachably secured to said hopper and closing said bottom opening, said bottom cover including a pair of laterally extending and longitudinally spaced-apart end walls and an elongated longitudinally extending bottom wall, two elongated longitudinally extending inverted trough-like members carried by said bottom cover and disposed in the bottom of said hopper and defining two elongated longitudinally extending tunnels therethrough, said members being arranged in nested relation with each other so that an inner of said tunnels is defined within the inner of said members and so that an outer of said tunnels is defined between said members, the outer end of said outer member being joined to one of said end walls and the adjacent inner end of said inner member terminating short of said one end wall, the outer end of said inner member joining the other of said end walls and the adjacent inner end of said outer member terminating short of said other end wall, the opposite lower side edges of both of said members being spaced somewhat above the adjacent surface of said bottom wall to define two elongated longitudinally extending and laterally spaced-apart narrow slots respectively communicating between the opposite sides of the bottom of said hopper and the bottom sides of the bottom of said outer tunnel and also to define two elongated longitudinally extending and laterally spaced-apart narrow passages respectively communicating between the opposite sides of the bottom of said outer tunnel and the opposite sides of the bottom of said inner tunnel, whereby the granular material contained in said hopper spills laterally through said narrow slots and accumulates in two elongated longitudinally extending heaps respectively disposed in the opposite sides of the bottom of said outer tunnel and without obstructing the top thereof, two conduits respectively carried by said end walls and respectively communicating with the adjacent outer ends of said tunnels, and means extending between said members for blocking the inner end of said outer tunnel, whereby a current of air may be passed from one of said conduits into the adjacent outer end of the corresponding one of said tunnels and longitudinally therethrough toward the inner end thereof so as to form therefrom two air curtains respectively sweeping from said one tunnel laterally through said narrow passages into the other of said tunnels and so as to reform therefrom a current of air passing longitudinally through said other tunnel and from the inner end thereof toward the outer end thereof and into the other of said conduits, with the result that the granular material accumulated in each heap is entrained into the corresponding air curtain and is transported therewith and is then entrained into the reformed current of air and is transported therewith into said other conduit, thereby to effect pneumatic unloading of the granular material from said hopper via said other conduit.

15. The combination set forth in claim 14, wherein the cross sectional area of said outer tunnel progressively decreases from the outer end thereof toward the inner end thereof, and the cross sectional area of said inner tunnel progressively increases from the inner end thereof toward the outer end thereof.

16. The combination set forth in claim 15, wherein the top of said outer member is substantially parallel to the opposite lower side edges thereof and the top of said inner member is upwardly inclined from the inner end thereof toward the outer end thereof and with respect to the opposite lower side edges thereof, whereby the cross sectional area of said outer tunnel progressively decreases from the outer end thereof toward the inner end thereof and the cross sectional area of said inner tunnel progressively increases from the inner end thereof toward the outer end thereof.

17. A railway car comprising an elongated longitudinally extending body including bottom structure defining an elongated longitudinally extending communicating hopper and adapted to contain granular material, said hopper having a length commensurate with that of said body between the opposite ends thereof, said hopper including a pair of elongated longitudinally extending and laterally spaced-apart and downwardly and inwardly sloping side walls and a pair of laterally extending and longitudinally spaced-apart and downwardly and inwardly sloping end walls and having a corresponding elongated longitudinally extending bottom opening therein, said end walls having a pair of longitudinally aligned end openings therein, a pair of laterally extending and longitudinally spaced-apart end plates respectively detachably secured to said end walls and respectively closing said end openings, an elongated longitudinally extending bottom plate detachably secured to said side walls and to said end plates and closing said bottom opening, an elongated longitudinally extending inverted trough-like member fixedly secured to said end plates and disposed in the bottom of said hopper when said bottom plate is secured to said side walls and to said end plates, said member defining an elongated longitudinally extending tunnel therethrough, the opposite lower side edges of said member being spaced somewhat above the adjacent surface of said bottom plate to define two elongated longitudinally extending and laterally spaced-apart narrow slots respectively communicating between the opposite sides of the bottom of said hopper and the opposite sides of the bottom of said tunnel when said bottom plate is secured to said side walls and to said end plates, whereby the granular material contained in said hopper spills laterally through said narrow slots and accumulates in two elongated longitudinally extending heaps respectively disposed in the opposite sides of the bottom of said tunnel and without obstructing the top thereof, and two longitudinally spaced-apart conduits respectively fixedly secured to said end plates, the inner ends of said conduits being in direct open communication through the respectively adjacent end openings in said end walls with the respectively adjacent outer ends of said tunnel, whereby a current of air may be passed from one of said conduits longitudinally through said tunnel and into the other of said conduits, with the result that the granular material accumulated in each heap is entrained into the current of air passing longitudinally through said tunnel and is transported therewith into said other conduit, thereby to effect pneumatic unloading of the granular material from said hopper via said other conduit.

18. The railway car set forth in claim 17, and further comprising inlet and outlet fixtures respectively carried by said inlet and outlet conduits, said inlet fixture being selectively connectible to an air pressure main, whereby the current of air may be blown from said inlet conduit through said tunnel and into said outlet conduit to effect the pneumatic unloading of the granular material from said body, said outlet fixture being selectively connectible to an air suction main, whereby the current of air may be sucked from said inlet conduit through said tunnel and into said outlet conduit to effect the pneumatic unloading of the granular material from said body, and wherein said member requires no adjusting or adapting to accommodate said tunnel to the indiscriminate employment of the associated air pressure main or the associated air suction main in the pneumatic unloading of the granular material from said body.

19. The railway car set forth in claim 17, wherein said tunnel has an aspect ratio at least as great as 12.

References Cited by the Examiner
UNITED STATES PATENTS

| 2,950,143 | 8/1960 | Koranda | 302—52 |
| 2,950,144 | 8/1960 | Dorey | 302—52 |
| 3,050,342 | 8/1962 | Koranda | 302—52 |
| 3,069,207 | 12/1962 | Borger | 302—52 |
| 3,079,032 | 2/1963 | Dorey | 302—52 |
| 3,088,776 | 5/1963 | Aller | 302—52 |

SAMUEL F. COLEMAN, *Primary Examiner.*

ANDRES H. NIELSEN, *Examiner.*